United States Patent [19]

Waugh

[11] Patent Number: 4,582,343

[45] Date of Patent: Apr. 15, 1986

[54] LIGHTWEIGHT REAR-WHEEL BICYCLE SUSPENSION

[76] Inventor: David J. Waugh, 5383 Waring Rd., San Diego, Calif. 92120

[21] Appl. No.: 645,749

[22] Filed: Aug. 30, 1984

[51] Int. Cl.⁴ ............................................. B62K 25/10
[52] U.S. Cl. ..................................... 280/284; 180/227
[58] Field of Search .............. 280/284, 285, 708, 709, 280/275, 277; 180/227

[56] References Cited

U.S. PATENT DOCUMENTS

| | | | |
|---|---|---|---|
| 1,071,892 | 9/1913 | Diepenhorst | 280/284 |
| 4,159,105 | 6/1979 | Vander Laan | 180/227 |
| 4,415,057 | 11/1983 | Yamaguchi | 280/284 |

FOREIGN PATENT DOCUMENTS

| | | | |
|---|---|---|---|
| 405635 | 8/1943 | Italy | 280/284 |
| 104022 | 2/1917 | United Kingdom | 280/284 |
| 2123764 | 2/1984 | United Kingdom | 280/284 |

*Primary Examiner*—Joseph F. Peters, Jr.
*Assistant Examiner*—Everett G. Diederiks, Jr.
*Attorney, Agent, or Firm*—Henri Charmasson; Janet E. Hasak

[57] ABSTRACT

A lightweight rear-wheel suspension for a bicycle which includes a triangulated main frame, a rear wheel support frame such as a rear fork rotatably supporting a rear wheel and mounted to the main frame so that it pivots about the foot crank rotational axis, providing upward and downward movement relative to the main frame, a spring-loaded hydraulic shock absorber for damping the relative movement of the rear wheel, said shock absorber having its outer housing incorporated as a rigid structural element of said triangulated main frame, its sliding piston assembly connected to said rear wheel support frame via a linkage system which converts the arcuate motion of said rear wheel support frame into linear motion in line with the linear motion of said sliding piston assembly, and incorporating a rider-controlled valve for hydraulically locking and unlocking said shock absorber, allowing the rear suspension to function both in a suspended mode and a rigid mode.

6 Claims, 4 Drawing Figures

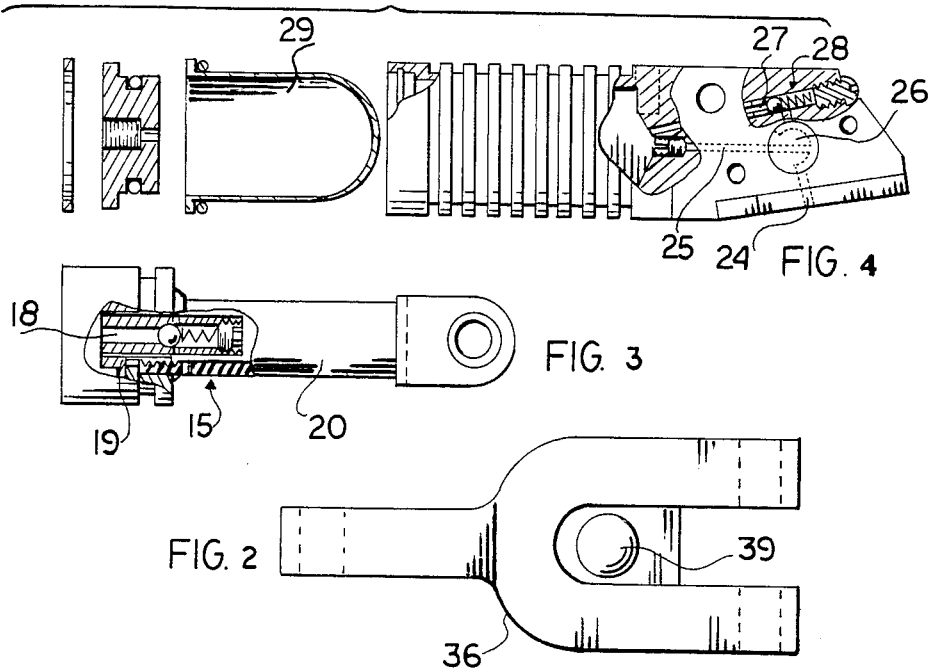
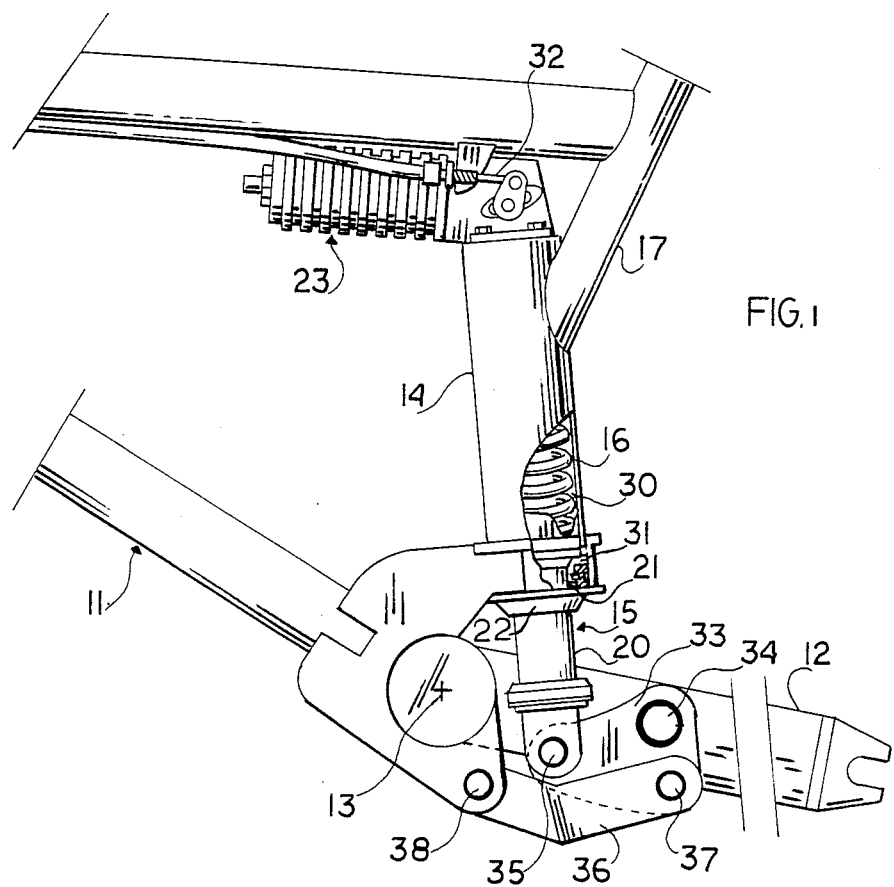

LIGHTWEIGHT REAR-WHEEL BICYCLE SUSPENSION

FIELD OF THE INVENTION

The present invention relates to lightweight suspension systems for use on motorcycles and bicycles, shock absorbers which can be hydraulically locked to eliminate damping action, and linkage systems to convert arcuate movement into linear movement.

BACKGROUND OF THE INVENTION

A suspension system incorporated into a bicycle not only reduces the shock to which the rider is subjected when riding over rough terrain, but it also provides more uniform traction on rough surfaces by allowing the wheels to more closely follow the contour of the road surface. Heretofore, bicycle suspension systems have been modifications of existing motorcycle suspension designs. The incorporation of such a system in a bicycle necessarily results in a bicycle wich is unacceptably heavy for any type of competition use. In addition, during a sprint, a bicyclist will often pedal in a standing position without being seated. Such a pedaling technique subjects a bicycle to a series of downward loads which would repeatedly collapse a suspension system, causing a partial absorption of the energy input by the rider.

The instant invention was designed with bicycle moto cross ("BMX") race courses in mind. Such courses usually include level terrain as well as harsh terrain. Harsh terrain not only subjects the rider to a series of shocks, but it also restricts his speed. An effective suspension would allow higher speeds over such terrain, especially when cornering. Despite the obvious advantages of a suspension system under BMX riding conditions, the problems of weight and energy absorption must be overcome if a suspended BMX bicycle is to be competitive in a sport where maneuverability and rapid acceleration are of crucial importance.

Miyakoshi et al. in U.S. Pat. No. 4,440,413, have disclosed a variable rate suspension system for the rear wheel of motocycles which uses a system of linkages designed so that the rate of increase in the compression stroke of the shock absorber increases in proportion to the upward movement of the rear wheel relative to the main frame of the motocycle. The instant invention, on the other hand, uses a linkage system to convert arcuate motion into linear motion so that the shock absorber housing can be integral with the frame.

SUMMARY OF THE INVENTION

There are two principal objectives of the instant invention. The first is to provide an ultra-lightweight suspension system for the rear wheel of a bicycle which is capable of absorbing shocks which are generated at either the front or rear wheel. The second is to provide a rider-controlled means for hydraulically locking and unlocking said suspension system in order to provide both rigid and suspended mounting of the rear wheel.

The invention has succeeded in accomplishing the aforementioned objectives in a novel fashion. In order to keep the vehicle weight increase to a minimum, the shock absorber housing has been incorporated as a structural element of the bicycle's frame. The rear fork has been designed to pivot about the axis of the foot crank assembly. This design has several decided advantages over the traditional mounting of the rear fork or swing arm in a rear-wheel motocycle suspension. Firstly, the distance between chain sprockets remains constant as the rear fork pivots up and down. Secondly, a significant weight reduction is achieved by combining the rotational axes of the several components. Thirdly, the suspension pivot point is placed mear the wheelbase midpoint and directly beneath the rider. Hence, the shock absorber damps shocks generated at either wheel. The rigid mounting of the shock absorber housing necessitated the creation of a mechanical means for translating the arcuate motion of the rear fork into linear motion so that the hydraulic damping piston assembly shock absorber would not bind within the rigidly mounted housing as it slides up and down therein. A multiple lever arrangement has been chosen to convert the arcuate motion to linear motion. The means chosen to hydraulically lock the shock absorber comprises a rider-controllable valve which regulates the flow of hydraulic fluid from the shock absorber housing to a gas and hydraulic fluid reservoir.

BRIEF DESCRIPTION OF THE DRAWINGS

FIG. 1 is a partial elevational side view of a bicycle equipped with a rear-wheel suspension constructed according to the invention;

FIG. 2 is an enlarged top plan view of a wish-bone-shaped lever which is part of the lever system which converts arcuate motion to linear motion;

FIG. 3 is a side elevational view of the sliding hydraulic damping piston assembly;

FIG. 4 is a partially-exploded, side elevational view of the gas and hydraulic fluid reservoir.

DESCRIPTION OF THE PREFERRED EMBODIMENT OF THE INVENTION

The preferred embodiment of the invention utilizes a triangulated bicycle frame 11 which incorporates a rear fork 12 which pivots about the rotational axis of the foot crank assembly 13. A rear wheel is secured in a conventional manner to the slotted ends of both rear fork tines. The foot crank rotational axis 13 was chosen as the rotational axis of the rear fork in an effort to place the suspension pivot point near the wheelbase midpoint and beneath the rider's center of gravity. The suspension effect of the rear wheel is thus shared by the front wheel; a shock to either wheel is partially absorbed by the hydraulic damping system described below. The rear fork pivot location has the addditional advantage of allowing the bicycle's drive chain to ride on sprockets whose rotational axes remain equidistant as the rear fork pivots; the need for a chain tensioning device is thus eliminated.

A tubular housing 14 for both a sliding hydraulic damping piston assembly 15 and a coil compression spring 16 is incorporated into the bicycle frame 11 as a structural element, replacing most of the nearly vertical tube 17 in which a bicycle's seat post traditionally slides.

The piston assembly 15 slides within the tubular housing 14 and incorporates a one-way valve 18 which meters hydraulic flow on the assembly's compression stroke and an orifice 19 which meters hydraulic flow on rebound. The piston assembly 15 also serves as a compression platform for coil compression spring 16. The piston assembly 15 incorporates a circular connecting shaft 20 which slides through a circular seal 21 held by a threaded retaining cap 22 which screws into the bottom end of the housing 14.

A hydraulic fluid and gas reservoir 23 is hydraulically connected to the top of the housing 14 by means of two distinct paths, both of which share common gallery 24. The first path through primary gallery 25 may be opened and closed by means of a rotary valve 26. The second path through the secondary gallery 27 which incorporates a one-way rebound valve 28, allows hydraulic fluid to flow in only one direction, i.e. from the reservoir 23 to the housing 14. The reservoir 23 contains a bladder 29 which can be pressurized with air or nitrogen gas both to improve damping action by reducing vacuum formation during rapid oscillation of the piston assembly 15 and to ameliorate the effect of air bubbles which might become trapped once the hydraulic system is sealed from the atmosphere. As the piston assembly 15 slides upward in the housing, the circular connecting shaft 20 displaces within the tubular housing 14 a volume equal to the product of the cross sectional area of the shaft 20 and the length of the compression stroke, thus preventing all of the hydraulic fluid being displaced by the piston assembly 15 in the upper chamber 30 from flowing to the lower chamber 31. Consequently, some hydraulic fluid must flow to the pressurized reservoir via the primary gallery 25. If the primary gallery 25 is blocked by closed valve 26, upward movement of the piston assembly 15 is prevented. A twist grip control mounted on the bicycle's handlebars opens and closes the valve 26 via a cable 32. The rebound valve 28 allows the suspension to rebound to the fully extended position even when the primary gallery 25 is blocked.

The lever system depicted in FIG. 1, which interconnects the connecting shaft 20 and the rear fork 12, converts the arcuate motion of the rear fork 12 into linear motion so that the piston assembly 15 does not bind in the housing 14. The linkage system consists of a triangular-shaped lever plate 33 which is pivoted at its apices to the rear fork 12 at first apex pivot point 34, to the lower end of the connecting shaft 20 at second apex pivot point 35, and to one end of lower wish-bone lever 36 at third apex pivot point 37, respectively. The other end of the lower wish-bone lever 36 connects to the bicycle frame 11 at frame-lever pivot point 38. Pivot points 34, 35, 37 and 38 have parallel axis and utilize chrome plated steel pins turning in bronze "oilite" bushings. At the end of its downward travel, the lower end of connecting shaft 20 rests on rubber bumper 39.

What is claimed is:

1. A rear-wheel suspension for two-wheeled vehicles comprising:
   (a) a vehicle frame;
   (b) a rear-wheel support frame pivotally mounted to said vehicle frame for arcuate upward and downward movement relative thereto and supporting a rear wheel on its rotation axis;
   (c) a tubular hydraulic shock absorber housing rigidly affixed to said vehicle frame and serving as a structural member of said vehicle frame; and
   (d) a sliding hydraulic damping piston assembly, the upper portion of which remains bathed in hdyraulic fluid as the assembly slides within said housing, and the lower portion of which protrudes through a seal at the bottom of said housing;
   wherein the arcuate movement of the rear-wheel support frame is translated through two interconnected levers into linear movement of said sliding hydraulic damping piston assembly, which levers comprise a triangular-shaped lever plate which is pivoted, respectively, at its three apices, to the rear-wheel support frame, to the lower end of said sliding hydraulic damping assembly, and to one end of a lower lever having two parallel pivot axes which said lower lever connects said vehicle frame to said rear-wheel support frame, all of said apices being pivoted on an axis parallel to the rotation axis of the rear-wheel support frame;
   wherein the longitudinal axis of said tubular hydraulic shock absorber housing is coincident with the linear movement into which the arcuate movement on the rear-wheel support frame is translated; and
   wherein said rear wheel is rigidified hydraulically in relation to said vehicle frame by a hydraulic rigidifying means comprising a hydraulic fluid and gas reservoir connected via a first hydraulic line to said tubular hydraulic shock absorber housing and means to block said hydraulic line.

2. A rear wheel suspension according to claim 1 wherein said rear wheel support frame about the axis of rotation of a bicycle's crank set.

3. A rear wheel suspension according to claim 1 wherein said means for blocking said hydraulic line comprises:
   a valve at any point in said hydraulic line; and means to actuate said valve.

4. A rear wheel suspension according to claim 3 wherein said means to actuate said valve comprises:
   a handlebar mounted twist grip connected via a cable to said valve.

5. A rear wheel suspension according to claim 4 wherein a rebound means is provided to rebound said rear wheel support frame to a fully extended position once said hydraulic rigidifying means has been actuated.

6. A rear wheel suspension according to claim 5 wherein said rebound means comprises a one-way valve in a second hydraulic line connecting said housing and said reservoir.

* * * * *